US 8,239,778 B2

(12) United States Patent
Sheth-Voss et al.

(10) Patent No.: US 8,239,778 B2
(45) Date of Patent: Aug. 7, 2012

(54) GRAPHICAL DATABASE INTERACTION SYSTEM AND METHOD

(75) Inventors: Pieter Sheth-Voss, Belmont, MA (US); Geoffrey Cooney, Arlington, MA (US)

(73) Assignee: KGMP Trust, Boston, MA (US)

( * ) Notice: Subject to any disclaimer, the term of this patent is extended or adjusted under 35 U.S.C. 154(b) by 1025 days.

(21) Appl. No.: 11/759,595

(22) Filed: Jun. 7, 2007

(65) Prior Publication Data
US 2008/0195643 A1    Aug. 14, 2008

Related U.S. Application Data

(60) Provisional application No. 60/888,822, filed on Feb. 8, 2007.

(51) Int. Cl.
*G06F 17/30* (2006.01)
(52) U.S. Cl. .......................... 715/763; 715/967; 707/805
(58) Field of Classification Search .................. 707/101; 715/763, 967
See application file for complete search history.

(56) References Cited

U.S. PATENT DOCUMENTS

| | | | |
|---|---|---|---|
| 6,584,419 B1 * | 6/2003 | Alexander | 702/68 |
| 6,609,132 B1 * | 8/2003 | White et al. | 1/1 |
| 6,938,046 B2 | 8/2005 | Cooke et al. | |
| 7,275,063 B2 * | 9/2007 | Horn | 1/1 |
| 7,913,177 B1 * | 3/2011 | Smith et al. | 715/762 |
| 2002/0067358 A1 * | 6/2002 | Casari et al. | 345/440 |
| 2003/0034995 A1 * | 2/2003 | Osborn et al. | 345/713 |
| 2003/0088546 A1 * | 5/2003 | Brown et al. | 707/3 |
| 2003/0126106 A1 * | 7/2003 | Coen | 707/1 |
| 2004/0041838 A1 * | 3/2004 | Adusumilli et al. | 345/772 |
| 2005/0091012 A1 | 4/2005 | Przytula et al. | |
| 2005/0138160 A1 * | 6/2005 | Klein et al. | 709/223 |
| 2005/0192955 A1 * | 9/2005 | Farrell | 707/5 |
| 2005/0216312 A1 * | 9/2005 | Bellin et al. | 705/3 |
| 2006/0106847 A1 * | 5/2006 | Eckardt et al. | 707/101 |
| 2007/0046672 A1 * | 3/2007 | Shinohara et al. | 345/440 |
| 2008/0027788 A1 * | 1/2008 | Lawrence et al. | 705/10 |
| 2008/0163085 A1 * | 7/2008 | Subbu et al. | 715/763 |

OTHER PUBLICATIONS

Norsys Software Corporation, brochure, http://www.orsys.com/netica.html, May 31, 2007, 4 pp.
Bayesian Network Technology, brochure, http://www.bayesia.com/GB/produits/bLab/BlabPresentation.php, 2002-2004, 2 pp.
"Visual Thinking for Business Intelligence", a White Paper by Tableau Software CTO Pate Hanrahan, 2003-2005, 18 pp.

* cited by examiner

*Primary Examiner* — Boris Pesin
*Assistant Examiner* — Daeho Song
(74) *Attorney, Agent, or Firm* — Onello & Mello, LLP

(57) ABSTRACT

Various aspects of the present invention include a database interaction system and method comprising: a display, a set of user input devices, and a database comprising a data set including a plurality of fields and associated field values; a graph model configured to define a plurality of nodes and states, each node representing a field from the plurality of fields; a graph-to-data mapper configured to map the field values to states contained in the nodes of the graph model; and a graphical interface module configured to generate for display one or more nodes from the plurality of nodes, wherein a display of a node includes a graphical representation of field values associated with a specific field represented by the displayed node and states contained therein.

60 Claims, 11 Drawing Sheets

GRAPHICAL DATABASE INTERACTION SYSTEM AND METHOD

CROSS REFERENCE TO RELATED APPLICATION

This application claims the benefit under 35 U.S.C. §119 (e) of U.S. Provisional Application No. 60/888,822, filed Feb. 8, 2007, entitled GRAPHICAL DATABASE INTERACTION SYSTEM AND METHOD.

FIELD OF INTEREST

The present inventive concepts relate to the field of databases and approaches for graphical representation, navigation and manipulation of same.

BACKGROUND

Many graphical user interfaces have been developed for presenting the contents of a database. Such systems include (a) spreadsheet packages, such as Microsoft Excel and Lotus 1-2-3, (b) database systems, such as Microsoft Access and Microsoft SQL Server, (c) statistical packages such as SAS and SPSS, (d) statistical crosstab analysis packages such as Quantum, (e) business intelligence systems, such as Microstrategy and Hyperion, and (f) data mining systems such as SAS Enterprise Miner.

All of these packages provide graphical user interfaces by which users can query the results of the database and summarize the results in various forms. One common interface is the Structured Query Language (SQL), in which a user writes queries using a text interface and can see the results in a text or tabular view.

Another common approach to presenting the contents of the database is to present data and metadata in tabular or spreadsheet-like views. In the case of data, each row represents a record and each column represents a field; each cell contains the value of that field for that record. In the case of metadata, each row represents a field, and each column represents a property of the field; each cell contains the value of the property for that field. Most database packages offer spreadsheet or tabular views of the data itself.

However, a database can easily contain far too much information for a human analyst to easily explore and interpret the contents. As a result, graphical interfaces generally display not only the database contents directly, but also summaries of the data, such as cross-tabulations, or crosstabs, that summarize the relative frequency with which particular values of one or more fields occur.

There are also other graphical approaches to representing database contents. These include bar charts, line charts, scatter charts, histograms, and time series. Most database packages offer these features directly or support interoperation with other database software packages.

Although these applications allow the user to specify a set of inclusion criteria and formatting of the graphical representation, the graphical summaries are essentially static depictions, and they generally do not allow the user to query the data itself via the graphical representation. For instance, in traditional database reporting applications, a user can choose to view a bar chart of a particular data series. However, clicking on a particular bar in the chart does not allow the user to query other data in the database that is associated with the data represented by the bar. Thus, current applications offer an inefficient means of analyzing data because a user must repeat the steps of creating a particular graphical representation of data many times over in order to organize data in a variety of ways.

While many database interfaces provide some mechanisms for the user to interactively specify what data is to be included in the graphical summaries (for example, Microsoft Excel provides pivot tables that display an interactive crosstab summary of data), such mechanisms are separate interfaces from the graphical views themselves. For instance, in Excel pivot tables the "wizard" used to specify the pivot table appears as a separate interface from the crosstab itself.

Some database applications also provide graphical user interfaces to the metadata. A common graphical approach to representing metadata, rather than the data themselves, is the Entity Relationship Model (ERM). This consists of arcs and nodes. Each node represents a table. Each arc represents a relationship between tables, based on primary and foreign keys. However, these applications do not provide a graphical model in which nodes represent fields rather than tables, and arcs represent statistical relationships rather than foreign-key relationships.

Apart from these typical database applications, are Bayesian Networks and Probabilistic Relational Networks. Bayesian networks can be used for modeling the statistical relationships among variables, and some software packages provide facilities for estimating these models from data in relational databases.

In a Bayesian network, variables are represented as nodes. Each variable can take one of a discrete set of states, although each state can map to a range of continuous values in an underlying database. The node display shows a statistical distribution illustrating the probability of each state, and possibly other statistics such as the mean and standard deviation. These distributions represent marginal probability distributions over a probability space defined by all the nodes in the network.

Some software applications for Bayesian Networks provide a graphical user interface for interacting with the model. Typically, within each node is displayed a graphical representation of the distribution of values underlying the node. For instance, this can be in the form of a bar chart or pie chart. In contrast to traditional database applications, the user can click directly on the nodes via the graphical interface, to enter "findings" that specify constraints on the values of one or more nodes. In other words, the user can click on a state in a node, thus selecting a subset of probability space corresponding to that state. A mathematical inference engine calculates the implications of those constraints and updates the distributions of all affected nodes. As a result, each other node can be automatically updated to reflect the marginal probability distribution of its states over that newly defined subset of probability space.

However, these graphical Bayesian networks do not directly display the contents of the database. Rather, they display models of the database that are estimated from the data, and an inference engine synthesizes the results to calculate the distributions. For any arbitrary set of findings, the distribution of values calculated by the Bayesian Network will generally not equal the distribution of values in the database. For large and/or complex networks, the approximation error due to modeling can be substantial, particularly when the analysis drills down into subsets of the probability space associated with the model. To be sure, it is possible to develop a Bayesian network model in which, for all possible queries, the model results almost exactly represent the distribution of the data used to estimate the model. However, such a Bayesian network would require a number of parameters that increases exponentially with the number of nodes and states in the network and, as a result, is not practical.

The user interfaces for interacting with Bayesian networks provide a convenient means for selecting a subset of possible values and displaying the impact on the distributions of related nodes. Through such graphical interaction, a human analyst is able to explore the interrelationships and gain a clearer understanding of the model. However, such interactive interfaces are lacking in database and data reporting packages. Consequently, there is a need to provide such an interactive interface that enables a user to quickly explore the contents of a database, without the need for estimating models or viewing results that do not exactly match the data.

SUMMARY OF INVENTION

In accordance with various aspects of the present disclosure, provided is a database interaction system. The system comprises a database comprising a data set including a plurality of fields, wherein each field has an associated set of field values. The system also comprises a database interpreter configured to define a graph model having a plurality of nodes that represent the plurality of fields, each node including a set of states. The system also includes a graph-to-data mapper configured, for each of the plurality of nodes, to map a field to a node, and field values associated with the field to states associated with the node. And the system includes a graphical interface module configured to display one or more nodes from the graph model, each displayed node including a distribution of field values across states of the displayed node.

The plurality of fields can include a set of predefined fields and at least one virtual field defined though user interaction with the graphical interface module.

The graphical interface module can be further configured to display one or more of a field name, node name, and descriptive label associated with the displayed one or more nodes or with one or more fields represented by the displayed one or more nodes.

The display of one or more nodes can include a display of metadata.

The graphical interface module can be further configured to display the one or more nodes with graphical properties that indicate properties of the metadata.

The graphical properties can include one or more of color, shape, size, shading, and inclusion or omission of a character or icon.

The metadata can include information associating at least two nodes from the one or more nodes as a group of nodes.

The one or more nodes can include at least one group node, wherein a group node represents a joint distribution of field values associated with its constituent nodes.

The set of states can represent a domain of an associated node, wherein a domain can be discrete having a finite set of states or continuous having an infinite set of states.

The distribution of field values across states can include field values represented as data in at least one of a histogram, a pie chart, a bar chart, a line graph, and a cross tab view.

The distribution of field values across states can include a percentage of each of the field values associated with each of the states.

The graphical interface module can be further configured to display at least one statistical measure determined from the mapping of field values to states for at least one node.

The at least one statistical measure can comprise one or more of a mean, median, mode, and standard deviation.

The graphical interface module can be configured to graphically update each state in each of the displayed one or more nodes in response to selection of one state of one of the one or more nodes.

The displayed one or more nodes can be a representation of a reference data set and the graphical interface module can be configured to enable selection of a current subset of data by selecting a state of one of the one or more nodes, and can be further configured to display of the one or more nodes to include a comparison of the current subset of data to the reference data set for each state of each of the one or more nodes.

The displayed one or more nodes can be a representation of a reference data set and the graphical interface module can be configured to enable selection of a current subset of data by selecting a state of one of the one or more nodes, and can be further configured to display a snapshot of a node selected from the one or more nodes, wherein a snapshot is a comparative representation of the current subset of data with the reference data set for each state of the selected node.

The comparative representation can be graphically coded to indicate a greater than or less than difference of the current subset of data relative to the reference data set for each state of the selected node.

The displayed one or more nodes can be a representation of a reference data set and the graphical interface module can be configured to enable selection of a current subset of data by selecting a state of one of the one or more nodes, and can be further configured to display a selection subset monitor showing the size of the current subset of data relative to the data set contained in the database or a data subset contained in the one or more nodes for a given set of constraints, where size is a simple or weighted count of the relevant records that comprise the current subset of data.

The displayed one or more nodes can be a representation of a reference data set and the graphical interface module can be configured to enable selection of a current subset of data by selecting a state of one of the one or more nodes, and can be further configured to display a top movers monitor configured to show nodes from the plurality of nodes having a marginal distribution in the current subset of data that are either most different from or most similar to their distributions in the reference data set.

The graphical interface module can be further configured to display a closest neighbor monitor showing the nodes from the plurality of nodes that are most correlated with a selected node from the displayed one or more nodes.

In accordance with another aspect of the disclosure, provided is a method of interacting with a database using a computer system having a display and a set of user input devices. The method comprises providing a data set including a plurality of fields, wherein each field has an associated set of field values and defining a graph model having a plurality of nodes that represent the plurality of fields, each node including a set of states. The method also includes, for each of the plurality of nodes, mapping a field to a node and field values associated with the field to states associated with the node. And the method includes displaying one or more nodes from the graph model, each displayed node including a distribution of field values across states of the displayed node.

The plurality of fields can include a set of predefined fields and at least one virtual field defined though user interaction with the data set.

The method can further include displaying one or more of a field name, node name, and descriptive label associated with the displayed one or more nodes or with one or more fields represented by the displayed one or more nodes.

Displaying the one or more nodes can include displaying metadata.

The method can further comprise displaying the one or more nodes with graphical properties that indicate properties of the metadata.

The graphical properties can include one or more of color, shape, size, shading, and inclusion or omission of a character or icon.

The metadata can include information associating at least two nodes from the one or more nodes as a group of nodes.

Displaying one or more nodes can include displaying at least one group node, wherein a group node represents a joint distribution of field values associated with its constituent nodes.

The set of states can represent a domain of an associated node, wherein a domain can be discrete having a finite set of states or continuous having an infinite set of states.

Displaying the one or more nodes can include displaying the distribution of field values across states to include field values represented as data in at least one of a histogram, a pie chart, a bar chart, a line graph, and a cross tab view.

Displaying the one or more nodes can include displaying the distribution of field values across states to include a percentage of each of the field values associated with each of the states.

The method can further include displaying at least one statistical measure determined from the mapping of field values to states for at least one node.

The at least one statistical measure can comprise one or more of a mean, median, mode, and standard deviation.

Displaying the one or more nodes can include graphically updating each state in each of the displayed one or more nodes in response to selection of one state of one of the one or more nodes.

The displayed one or more nodes can be a representation of a reference data set and the method can include, in response to selection of a current subset of data by selecting a state of one of the one or more nodes, displaying the one or more nodes to include a comparison of the current subset of data to the reference data set for each state of each of the one or more nodes.

The displayed one or more nodes can be a representation of a reference data set and the method can include, in response to selection of a current subset of data by selecting a state of one of the one or more nodes, displaying a snapshot of a node selected from the one or more nodes, wherein a snapshot is a comparative representation of the current subset of data with the reference data set for each state of the selected node.

The comparative representation can be graphically coded to indicate a greater than or less than difference of the current subset of data relative to the reference data set for each state of the selected node.

The displayed one or more nodes can be a representation of a reference data set and the method can include, in response to selection of a current subset of data by selecting a state of one of the one or more nodes, displaying a selection subset monitor showing the size of the current subset of data relative to the data set contained in the database or a data subset contained in the one or more nodes for a given set of constraints, where size is a simple or weighted count of the relevant records that comprise the current subset of data.

The displayed one or more nodes can be a representation of a reference data set and the method can include, in response to selection of a current subset of data by selecting a state of one of the one or more nodes, displaying a top movers monitor configured to show nodes from the plurality of nodes having a marginal distribution in the current subset of data that are either most different from or most similar to their distributions in the reference data set.

The method can further comprise displaying a closest neighbor monitor showing the nodes from the plurality of nodes that are most correlated with a selected node from the displayed one or more nodes.

In accordance with yet another aspect of the invention, provided is a computer program product stored in a computer readable media and configured for execution by a processor to carry out a method of interacting with a database using a set of user input devices. The method comprises providing a data set including a plurality of fields, wherein each field has an associated set of field values and defining a graph model having a plurality of nodes that represent the plurality of fields, each node including a set of states. The method also includes, for each of the plurality of nodes, mapping a field to a node and field values associated with the field to states associated with the node. And the method includes displaying one or more nodes from the graph model, each displayed node including a distribution of field values across states of the displayed node.

The plurality of fields can include a set of predefined fields and at least one virtual field defined though user interaction with the data set.

The method can further include displaying one or more of a field name, node name, and descriptive label associated with the displayed one or more nodes or with one or more fields represented by the displayed one or more nodes.

Displaying the one or more nodes can include displaying metadata.

The method can further comprise displaying the one or more nodes with graphical properties that indicate properties of the metadata.

The graphical properties can include one or more of color, shape, size, shading, and inclusion or omission of a character or icon.

The metadata can include information associating at least two nodes from the one or more nodes as a group of nodes.

Displaying one or more nodes can include displaying at least one group node, wherein a group node represents a joint distribution of field values associated with its constituent nodes.

The set of states can represent a domain of an associated node, wherein a domain can be discrete having a finite set of states or continuous having an infinite set of states.

Displaying the one or more nodes can include displaying the distribution of field values across states to include field values represented as data in at least one of a histogram, a pie chart, a bar chart, a line graph, and a cross tab view.

Displaying the one or more nodes can include displaying the distribution of field values across states to include a percentage of each of the field values associated with each of the states.

The method can further include displaying at least one statistical measure determined from the mapping of field values to states for at least one node.

The at least one statistical measure can comprise one or more of a mean, median, mode, and standard deviation.

Displaying the one or more nodes can include graphically updating each state in each of the displayed one or more nodes in response to selection of one state of one of the one or more nodes.

The displayed one or more nodes can be a representation of a reference data set and the method can include, in response to selection of a current subset of data by selecting a state of one of the one or more nodes, displaying the one or more nodes to include a comparison of the current subset of data to the reference data set for each state of each of the one or more nodes.

The displayed one or more nodes can be a representation of a reference data set and the method can include, in response to selection of a current subset of data by selecting a state of one of the one or more nodes, displaying a snapshot of a node selected from the one or more nodes, wherein a snapshot is a comparative representation of the current subset of data with the reference data set for each state of the selected node.

The comparative representation can be graphically coded to indicate a greater than or less than difference of the current subset of data relative to the reference data set for each state of the selected node.

The displayed one or more nodes can be a representation of a reference data set and the method can include, in response to selection of a current subset of data by selecting a state of one of the one or more nodes, displaying a selection subset monitor showing the size of the current subset of data relative to the data set contained in the database or a data subset contained in the one or more nodes for a given set of constraints, where size is a simple or weighted count of the relevant records that comprise the current subset of data.

The displayed one or more nodes can be a representation of a reference data set and the method can include, in response to selection of a current subset of data by selecting a state of one of the one or more nodes, displaying a top movers monitor configured to show nodes from the plurality of nodes having a marginal distribution in the current subset of data that are either most different from or most similar to their distributions in the reference data set.

The method can further comprise displaying a closest neighbor monitor showing the nodes from the plurality of nodes that are most correlated with a selected node from the displayed one or more nodes.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF PREFERRED EMBODIMENT

It will be understood that, although the terms first, second, etc. can be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 1A:
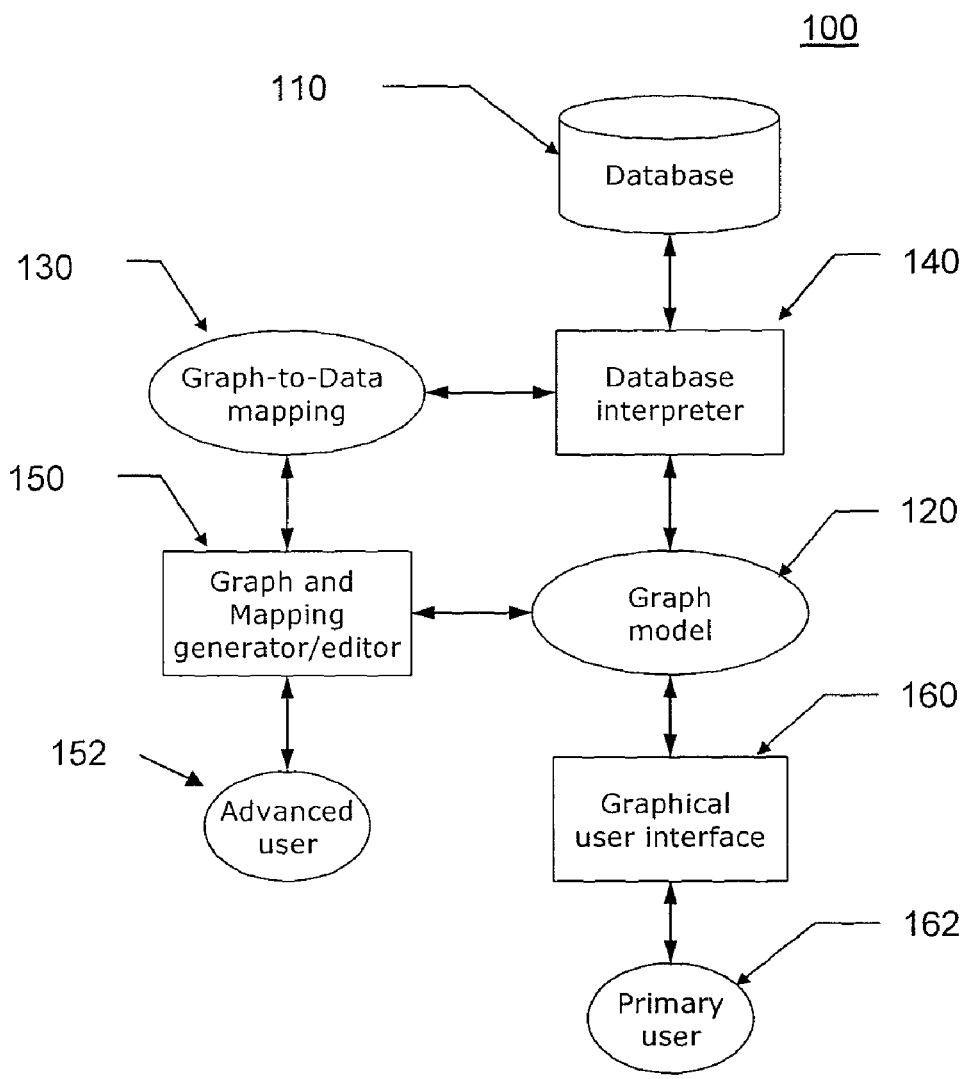
FIG. 1A is a block diagram depicting an embodiment of a graphical database interaction system, in accordance with aspects of the present invention.

FIG. 1A is a block diagram of an embodiment of a graphical database interaction system 100. The block diagram shows the major functional components or modules of the embodiment and the data that flows between them. These modules includes: (1) at least one database 110, (2) a graph model 120, (3) a graph-to-data mapper 130 configured to represent the conceptual relationship between the database 110 and the graph model 120, (4) a database interpreter 140 configured to query the database and obtain results consistent with the graph model 120, and (5) a graph and mapping generator/editor 150 configured to create and edit the graph model 120 and its association with the database 110. Screens depicting interactive views in the form of the graph model 120 can be generated by a graphical user interface 160 for display to a standard or primary user 162, e.g., a user for whom interactive access to the graphs or database views is required. The graph and mapping generator/editor 150 can be accessed by an advanced user 152, e.g., such as a programmer, administrator or other person for whom such authority and functionality is required.

Figure 1B:
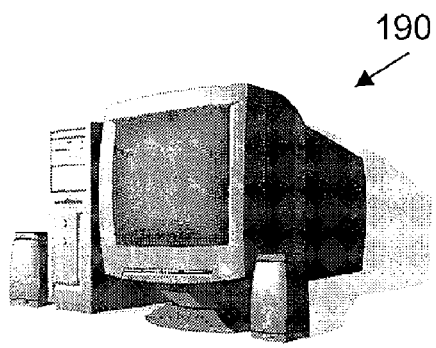
FIG. 1B is a diagram of a computer that could be used as a platform in the graphical database interaction system of FIG. 1A.

The above functional modules 120, 130, 140, 150 and 160 can be implemented in software, firmware, hardware, or some combination thereof. In the illustrative embodiment, the functional modules are implemented as computer program code executable by at least one computer 190, as shown in FIG. 1B. As example, the at least one computer can be or include a mainframe, personal computer, laptop, server, personal digital assistant or the like. In fact, any device, system, or combination of devices and/or systems having a processor, display, database and input device can implement the above modules. Such devices and/or systems could be collocated or they could be at different locations and communicate over a network, such as a local area network, wide area network, virtual private network, the Internet, World Wide Web, or any other type of network.

The graphical database interaction system and method provide a graphical way to view the structure and contents of the database 110. In doing so, provided is a mechanism by which "raw" data and metadata in the database can be mapped to the "polished" nodes, states, and groupings in the graphical view, as discussed above. The functional module that accomplishes this is the graph and mapping generator/editor 150 of FIG. 1A.

Mappings can be manually or automatically generated based on default assumptions as well as interfaces by which the mappings can be edited or even created by the user 152.

Another extension to the mapping functionality allows the handling of relational data. In addition to mapping to a specific field, each node also maps to a specific table. If there are nodes that map to multiple tables then the data network requires that a relational schema also be specified. The relational schema defines the relationships between the different tables in the data. Tables can be automatically joined together when necessary.

The modules in FIG. 1A are representative, but the invention is not limited to the modules shown.

Database

Figure 2:
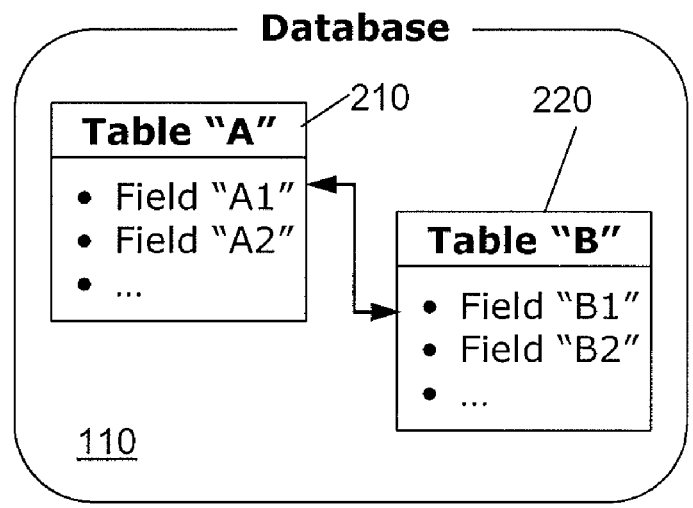
FIG. 2 is an illustrative representation of an embodiment of the database of FIG. 1A.

FIG. 2 shows an illustrative representation of an embodiment of database 110. Database 110 is comprised of one or more tables, e.g., Table A and Table B. Each table is comprised of one or more records and one or more fields, e.g., fields A1 and A2 in Table A and fields B1 and B2 in Table B. Each field is configured to hold a value for each of the one or more records. However, there need not be a value for each field in each record. Values can be numeric, text, or other objects.

Tables can be included in the database 110 explicitly or defined implicitly by queries. For instance, relationships among tables can be defined by means of primary and foreign keys that define pair-wise links between tables. As a result, a type of query called a "join" query can combine tables by means of primary and foreign keys, and thus define a new table that includes records and fields from multiple input tables. Additionally, another type of query called a "subsetting" query defines a new table which contains a subset of records and fields from an input table. For the purpose of describing the illustrative embodiment, the database can include tables with records and fields, and further, each field can belong to more than one table. A field is general; a field can be an actual specific field in the database, or a virtual field defined by a query. And each field in the database 110 can be represented as a node.

In addition to including data, database 110 can also include metadata, which describes or relates to the database. For instance, metadata can include the names of the tables, the names of the fields in each table, and the types of values that each field contains.

Note that database 110 describes and includes data, and can exist independently of any particular graph model. As such, database 110 can be a typical SQL database, as an example.

Graph Model

Figure 3:
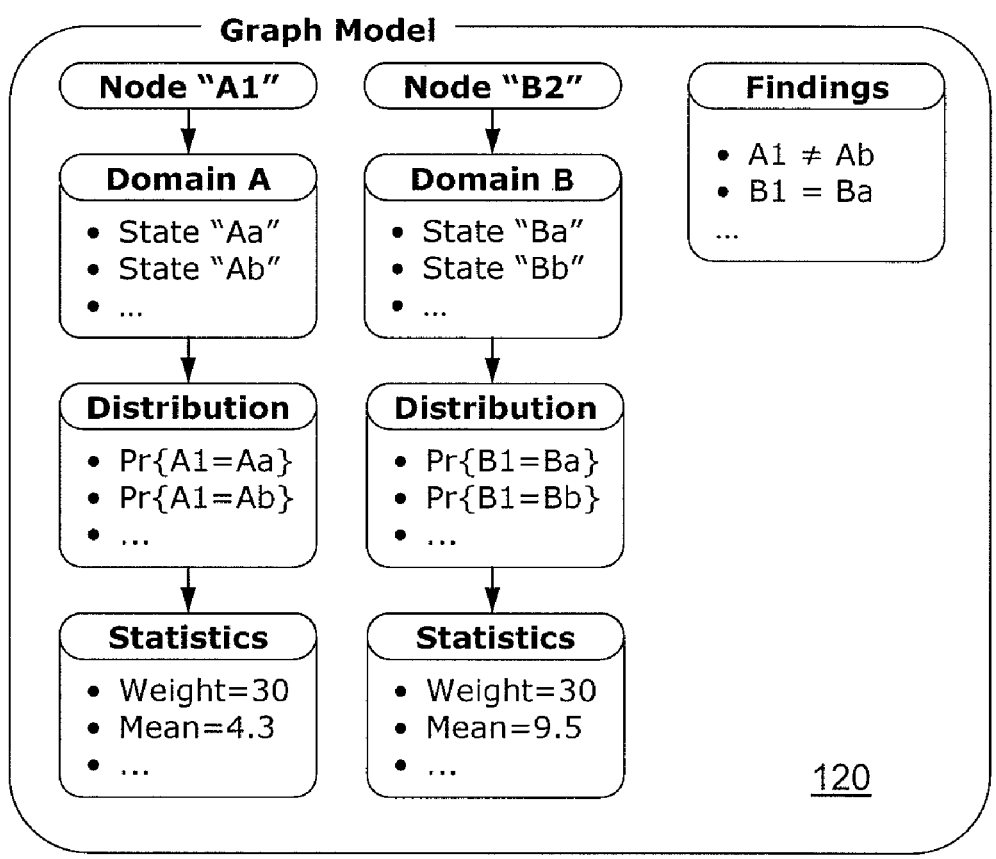
FIG. 3 is an illustrative representation of an embodiment of the graph model of FIG. 1A.

FIG. 3 shows an illustrative representation of an embodiment of graph model 120, which comprises one or more nodes, such as nodes A1 and B1. Each node has a name and a domain, such as domain A and domain B. Each domain is comprised of a set of discrete states, such as states Aa and Ab for domain A and states Ba and Bb for domain B. The set of states represents the set of possible values for the node. In this embodiment, the set of states is assumed to be exhaustive. Therefore, each domain includes a state that represents "None of the above states." If not defined explicitly, then the state is necessarily defined implicitly. Note that the graph model, in defining nodes and states, is simply an ontology of the subject matter, and may exist independently of any particular database.

Each node can also have a distribution, which is defined with respect to its domain. The distribution specifies the marginal probability that the node is in each state in the domain. For example, a distribution can be represented with the annotation "Pr{A1=Aa}," as shown in FIG. 3. By definition, in this embodiment, the probabilities sum to 1.0 or 100% across all states in the associated domain. As used herein, in this embodiment, the term "probability" means "frequency." Consequently, each node can be said to have a distribution defined by the relative frequencies of each state contained within the node.

The distribution itself can have various numerical and statistical properties. These include the total weight of data underlying that distribution, the mean of the distribution, and the standard deviation. Foe example, in FIG. 3, the statistics for Node A1 include weight=30 and Mean=4.3, as examples. These properties can be configured by the user to be displayed for each node.

Also, more than one node can share the same domain, although each node can have its own distribution.

The graph model also can include a set of "findings." A finding is an assertion about the state of the graph model. Specifically, it is an assertion that a particular node is either in a given state, or is not in a given state. Logically, it follows that if a node is in a given state, then the distribution of that node should have 100% probability associated with that state, i.e., is focused only on those records which include field values mapped to the given state. Conversely, if a node is not in a given state, then the distribution of that node should have 0% probability associated with that state, i.e., is focused only on those records which do not include field values mapped to the given state. Together, the set of findings represents a collective assertion that all individual findings are simultaneously true.

In the illustrative embodiment, the functional modules are implemented using the software programming language Java. Although, they could be implemented in any of a variety of known programming languages. Table 1 below details an embodiment of program code that can implement features of the public interface required to implement the graph model as described.

Table 2 below details an embodiment of program code that can implement features of the programming language interface for the graph model-database mapping described above.

TABLE 1

Java interface for Graph and related classes

```
class Graph {
        Node nodes[ ];
        Node getNode(String name);
        Finding findings[ ];
}
class class Node {
        public String name;
        public Node(Domain domain);
        public Domain getDomain( );
        public Distribution getDistribution( );
        public Properties getProperties( );
}
class Domain {
        String states[ ];
}
class Distribution {
        float probabilities[ ];
        float weight;
        float mean;
        float std_dev;
}
Class Finding {
        Node Node;
        State state;
        boolean equals;
}
```

TABLE 2

Java interface for Graph Model-to-Database Mapping

```
class GraphModelToDatabaseMapping {
        NodeMapping nodeMappings[ ];
        DomainMapping domain[ ];
}
class NodeMapping {
        String nodeName;
        String tableName;
        String fieldName;
        StateMapping stateMapping;
}
class DomainMapping {
        String name;
        String mappingType;
        ValueMapping valueMapping[ ];
}
class ValueMapping {
        String state;
}
class DiscreteValueMapping extends ValueMapping {
        String values[ ];
}
class ContinuousValueMapping extends ValueMapping {
        float min;
        float max;
}
```

Graph-to-Data Mapping

Figure 4:
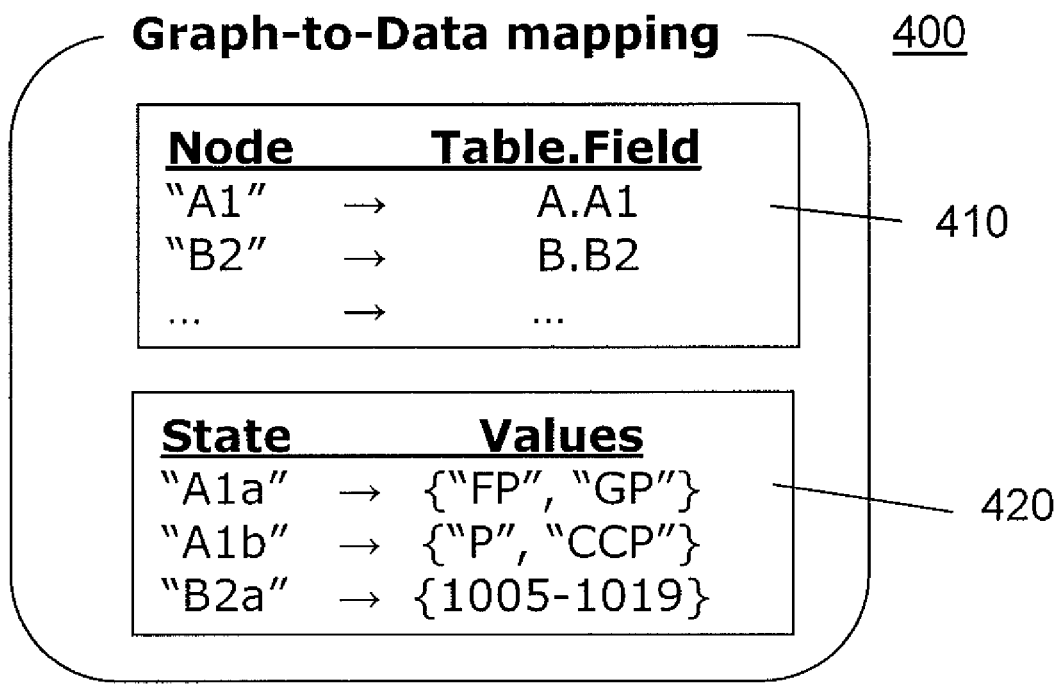
FIG. 4 is an illustrative representation of an embodiment of graph-to-data mapping module of FIG. 1A.

FIG. 4 shows an illustrative representation of an embodiment of graph-to-data mapping module 130. This module maps the contents of database 110 to the elements of the graph model 120. Again, generally speaking, the database can exist independently of any intent or means to display it graphically. Conversely, the graph model can exist independently of any means or intent to drive it using a specific database. The graph model-to-database mapping includes the information required to associate nodes in the graph model with fields in the database, and states in the graph model with values in the database.

The graph model-to-database mapping is comprised of node-to-field mapping and state-to-value mapping functionality. The node-to-field mapping, illustrated as 410 in FIG. 4, associates each node in the graph model to a field in the database 110. If the database allows different tables to include fields with the same field name, it may also be necessary to specify which table a field belongs. For example, Node A1 is mapped to table A and its field A1. Similarly, Node B2 is mapped to table B and its field B2.

A field can be mapped to more than one node. And each node can be mapped to at most one field. However, it is not necessary that all fields be mapped to nodes, or that all nodes be mapped to fields.

The state-to-value mapping, illustrated as 420 in FIG. 4, indicates what record field values are associated with each state. A state can be mapped to a single value, or a set of values. Values may be numeric, text, or other kinds of values, such as files, images, or other objects. Within a domain, state-to-value mappings can be exhaustive. Within each domain, an additional state can be implicitly defined that represents all values that are not mapped to other states in the domain. It is not necessary that each state within a domain be mutually exclusive; a value can map to more than one state within the domain, although it must map to at least one state.

Database Interpreter

Database interpreter 140 can be configured to perform the principal task of querying the database 110 and updating the distributions for each node in the graph model to reflect the contents of the database given the current set of findings (see FIG. 3).

Database interpreter 140 does the actual work of translating record data in fields (or field values) in the database 110 into states of domains and nodes in the graph model, and vice versa. Database interpreter 140 generates and executes queries of the database, and returns selected information to other components or modules of system 100 (see FIG. 1).

Database interpreter 140 performs subsetting queries, where all queries of record data are subject to constraints on the records for which values should be returned as findings. These constraints are used to determine the set of findings in the graph model. For instance, when a node is in a given state, the database interpreter 140 will query the database 110 about only records in the table associated with that node where the values in the database correspond to the given state.

Table 3 details an embodiment of program code that can implement features of the programming language interface to the database interpreter 140.

TABLE 3

Java interface for Database Interpreter

```
class DatabaseInterpreter {
        // Constructor
        Public DatabaseInterpreter(
        DatabaseConnection database,
        GraphModelToDatabaseMapping mapping
        );
        // Methods that return metadata
        String[ ] getTableNames( );
        String[ ] getFieldNames(String tableName);
        String getFieldType(String tableName, String fieldName);
        // Returns distribution for a node given current findings
        Distribution getDistribution(Node node, Findings findings);
```

TABLE 3-continued

Java interface for Database Interpreter

```
    // Updates all distributions for all nodes in a Graph Model
    void updateGraph(GraphModel graph);
}
```

In this embodiment, different database interpreters are used to interact with different kinds of databases. For example, one database interpreter can be configured to work with SQL databases that are ODBC-compliant. The database interpreter queries the database in the SQL language and interprets the results that are returned. Similarly, other database interpreters can be used for other databases, using information and approaches known in the art for communicating with such databases, including reading data from and writing data to such databases.

Primary Graphical User Interface

Primary graphical user interface (GUI) module 160 generates the displays and so on that enable a user, e.g., a human analyst, to interact with the system 100. The primary GUI generates displays of nodes on a screen in various ways, and receives mouse clicks, keyboard commands, and/or other inputs from the user with respect thereto. The specific behavior and appearance of the user interface is under the control of GUI module 160.

GUI module 160 also generates displays of summary statistics for each node, which represents the database values for the field associated with the node. For example, the display can include or take the form of bar charts representing the distribution of values, the mean, standard deviation, and/or various other statistics.

Using GUI module 160, the user 162 can specify a set of findings that represent assertions about the graph model. For example, in this embodiment, by clicking on a particular state of a particular node, the user 162 can assert a new finding in which the node is at the selected state. By shift-clicking on a particular state of a node (or by entering any other combination of keyboard and mouse inputs as defined by the user), for example, the user can assert a finding that the node is not at that state. By clicking a state that has already been observed, the user can clear the individual finding. The user can cumulatively specify a set of findings in this manner. By clicking another button, the user can clear all findings. Conversely, the user can save the cumulative set of findings over the reference data set, resulting in a new reference data set, for comparison with other subsets of data via a user defined combination of keyboard and mouse inputs. Thenceforth, only records whose field values correspond to certain states of certain nodes are summarized in the displays of the GUI, until a new subset of findings is defined.

Each time the subset of findings changes, the GUI module 160 calls the database interpreter 140 to update the graph model 120 given the current set of findings and updates the display accordingly.

Graph Model-to-Database Mapping Editor

Graph model-to-database mapping editor module 150 is a secondary graphical user interface that allows advanced users 152 to create and edit the graph-to-data mapping. Graph model-to-database mapping editor module 150 enables the user 152 to specify which fields in the database should correspond to which nodes in the graph model 120. It also enables the user 152 to specify which values in that field correspond to which states in that node's domain.

Further, in the illustrative embodiment, graph model-to-database mapping editor 150 can also query the metadata and record data for a field, and automatically generate nodes and domains that would be appropriate to represent fields and field values in the database 110, and automatically generate the corresponding mappings.

Also in the illustrative embodiment, the graph model-to-database mapping 150 can also create or modify nodes in the graph model 120 to reflect revisions to the graph model-to-database mapping.

Illustrative Example

FIGS. 5-13 illustrate an example embodiment of a graphical database interaction system, such as that shown in FIG. 1. The illustrative example is a medical context, with doctor and patient information existing in a database, however the present embodiment is not limited to any particular area of industry. The system enables access and presentation of the data in the database in a graphically interactive manner. As such, several graphical interactive displays and "monitors" are described herein below, and can be generated by the modules of FIG. 1A.

Database 110—Consider a hospital database that contains a table of physician records and a table of patient records. The physician table can have a field named "Spec_code". Individual records represent individual physicians. For each record, the values of this field can be numerical values, such as "1493" or "5", or text values, such as "CCP", "PUD," or "CCP-9a", which indicate the specialty of each physician. The actual meaning of these text codes may be specified in several different ways. For instance, in a separate table in a relational database linked by a foreign key. In other systems, e.g., SAS, these may be stored outside database 110 as value formats. In other cases, these may be stored elsewhere, e.g., in a document that identifies standard abbreviations for physician specialties. In this example, "PUD" stands for pulmonologist, and "CCP" stands for a pulmonologist that specializes in critical care.

In the patient table, individual records can represent specific patients. The patient table can have a field titled "DIAG1." For individual records, the value indicates the primary medical condition for which the patient was admitted. The actual field value would be a standard ICD-9-CM diagnosis code, known in the art, whose meaning is determined apart from the database 110.

Further, the physician table and patient tables may be linked by primary and foreign keys, as known in the art, to indicate which physician is primarily responsible for each patient during that admission.

An important aspect of this example is that the names of the tables and fields, and the field values in each record, are generally arbitrary and do not necessarily indicate a meaning associated with tables, fields, and record field values. The database contents may be cryptic and their meaning established externally.

Graph Model 120—In a graphical model, the above two fields are represented as nodes. For the field "Spec_code," a corresponding node titled "Physician Specialty" can be created. The domain of the node can contain the discrete states "Hospitalist," "Pulmonologist," "Infectious Disease," "Cardiologist," and "All Other." For the field "DIAG1," a node called "Primary Diagnosis" can be created. For that node, the user may define the domain as the states "Cardiovascular," "Gastrointestinal," "Central nervous system," "Trauma," and "All other."

Note that in defining the graphical model, an ontology of the subject domain is exposed. For instance, why are these physician specialties the primary divisions? Why do we care about delineating these patient diagnoses? These choices may be made even before data is collected, and depending on the application, different decisions may be appropriate even given the same data.

Graph-to-Data Mapping 130—The graph-to-data mapping serves as a dictionary used for translating between nodes/states in the graph model and fields/values in the database. For instance, the node "Physician Specialty" corresponds to the field "Spec_Code." The State "Pulmonologist" corresponds to both of the field values "CCP" and "PUD."

Database Interpreter 140—The database interpreter serves two roles: accessing the data contained in the database, and using a particular graph-to-data mapping 130 to determine frequency distributions for each node.

In a first role, the database interpreter identifies that there are two tables, and further identifies the fields that the tables contain, and the types of values that the fields contain. It further identifies the range of values that each field contains. These all provide information useful to a user in defining an appropriate graph model and graph model-to-database mapping for that graph model.

In the second role, as an example, the database interpreter 140 can report that there are 5,210 records where the specific value contained in the field "DIAG1" corresponds to the state "Cardiovascular" for the node "Primary diagnosis," and the value of "Spec_Code" can correspond to the state "Pulmonologist" of the node "Physician Specialty," where some additional criterion can be met. That criterion would be defined by constraints placed on other nodes using the graphical user interface 160.

Thus, the present invention provides a new graphical interface for viewing, interacting, and exploring the contents of database. This has several components: a main graphical display in which database fields are represented as a nodes, statistical relationships are represented as arcs, and nodes can be graphically organized in various ways; an interactive interface in which the user can specify various subsets of the data, and auxiliary views that display additional information and statistics, that support interactive exploration of the data.

Figure 5:
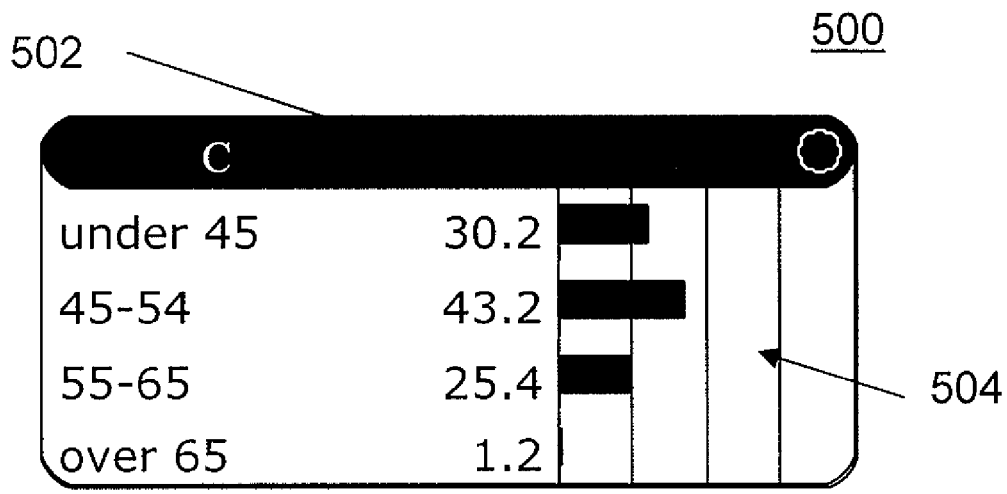
FIG. 5 shows an example of how a field in the database of FIG. 1A can be graphically represented as a node.

FIG. 5 is an example of how a field in the database can be represented as a node 500. The node contains information about the field itself (i.e. its metadata) and its values in the database 110. For instance, in FIG. 5, the node 500 has a title bar 502, which displays the name of the field, or a descriptive label. In this case, the node is labeled "Age" and happens to represent a field named "age" in the database. For example, a mapping can indicate that the database field "PatientData.A1" should map to the node titled "Age." It can also specify that the age '33' should map to the state titled "Under 45."

Below the title bar 502 is an area that displays a summary view 504 of the values of the field. In FIG. 5 the view is a "discrete view" that shows a histogram of values in which ranges of values are mapped into states, and for each state, a number shows the percent of field values that map to that state, and a bar may be shown whose length is proportional to that percentage. Here the states are "Under 45," "45-54," "55-65," and "over 65." For example, the percentage 30.2 for the state "under 45" means that 30.2% of the patient records in the database contain values of less than 45 in the field "PatientData.A1". As is clear from FIG. 5, the bars are representative of their corresponding percentages. The values are accessed from the database by the database interpreter 140 and mapped to the graph model using the graph-to-data mapping module 130.

The node display 500 can optionally show other statistics, such as the mean and standard deviation. Further, other displays or monitors are possible. For instance, the node may show the distribution as bar charts or pie charts, or even selected crosstab views.

The style of the node display 500 is determined by various properties that can contain information about the node's metadata. For instance, in FIG. 5 the "C" to the left of the title bar indicates that the field contains continuous (i.e. numeric), rather than discrete (i.e. categorical) values. The color and rounded shape of the node indicates that this is a patient factor, rather than a physician decision, in this example. These node properties can be defined by the user in the graph model 120.

Figure 6:
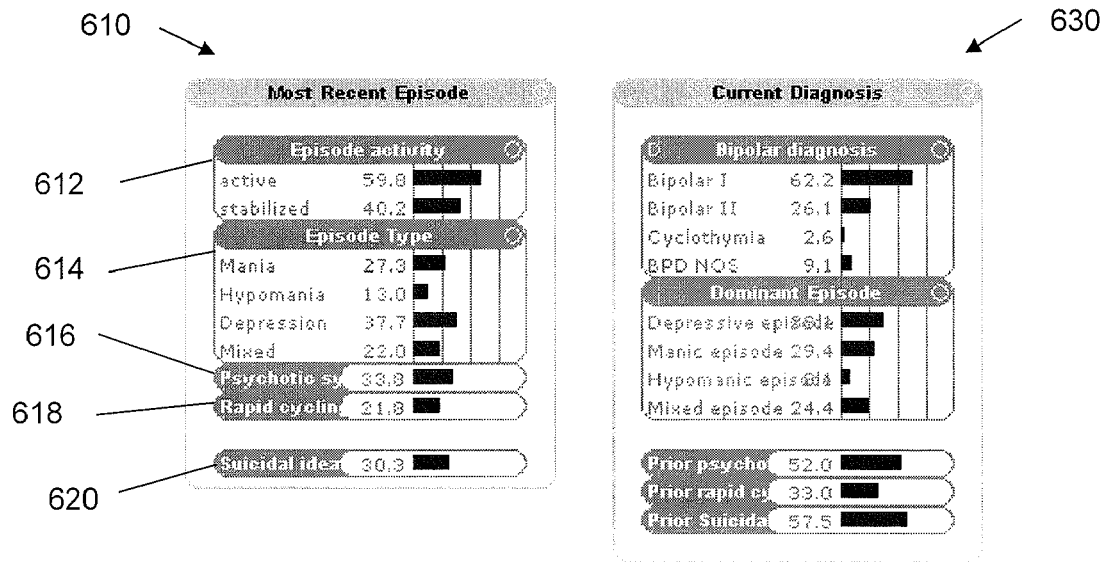
FIG. 6 shows an example of node groupings graphically represented that can be generated from the values in the database of FIG. 1A.

Groupings of nodes—Nodes can be visually organized into conceptual groupings. FIG. 6 shows a number of nodes, as examples, organized into groupings such as "Most Recent Episodes" 610 and "Current Diagnostics" 630. These groupings can be defined arbitrarily. They may represent fields in the same table, or fields that are related by other criteria. In FIG. 6, the grouping of nodes entitled Most Recent Episodes 610 includes the following nodes: Episode activity 612, Episode type 614, Psychotic symptoms 616, Rapid cycling 618 and Suicidal ideas 620. Each node includes at least one state, with the values in the database associated with the state represented in percentage and bar chart form. Similarly, the grouping of nodes named Current Diagnostics 630 also includes several nodes, each with at least one defined state and field values represented in percentage and graphical (e.g., bar chart) form.

Arcs—Arcs represent correlations between pairs of nodes that are statistically significant. There are many different statistical procedures for defining significance. The simplest is a pair-wise measure of association, such as the Pearson Correlation or Mutual Information. More sophisticated are algorithms of conditional dependence that seek to find the simplest correlation structure for a data set. The method of determining significance can be specified by the user and is not limited to any particular set of significance tests. At any instant, the user can select which, if any arcs should be shown, only arcs between groups, or just those arcs leading into or out of another node.

Figure 7:
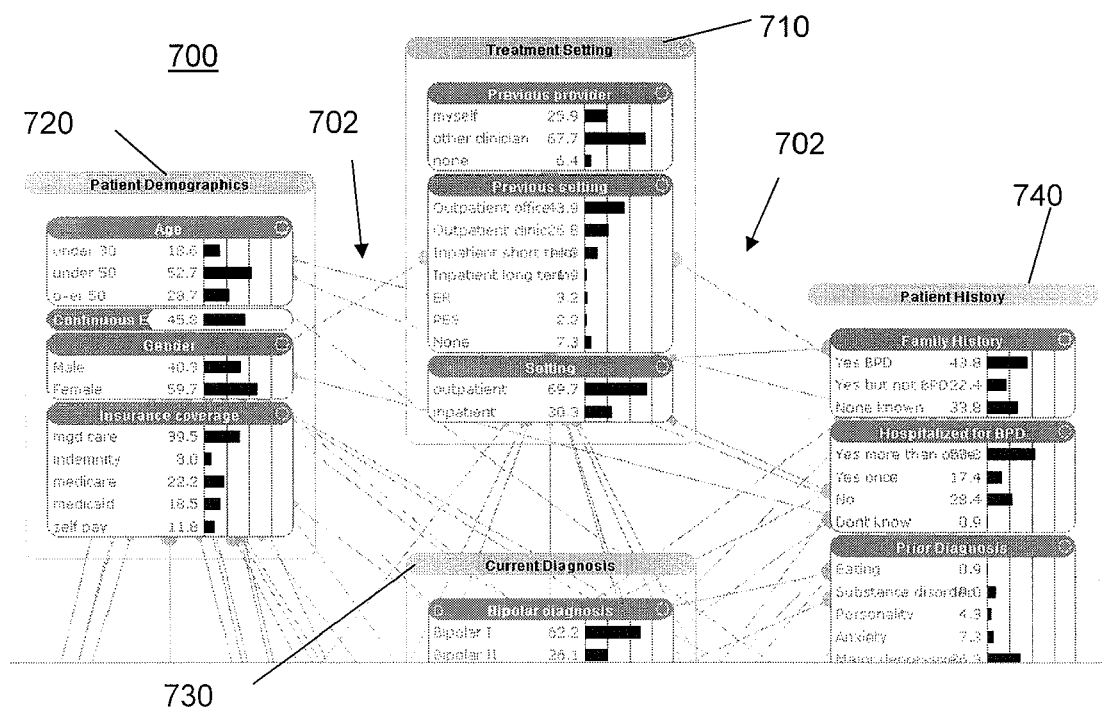
FIG. 7 shows an example of arcs between nodes graphically represented from the database of FIG. 1A.

FIG. 7 shows an example of arcs 702 between nodes graphically represented. Here, the arcs 702 are between nodes within groups of nodes. The groups of nodes are Treatment Setting 710, Patient Demographics 720, Current Diagnostics 730, and Patient History 740.

Interactive exploration—In the preferred embodiment, the node display is interactive. Clicking on the node allows the user to incrementally build up a set of constraints that define a subset of values in the database. At each step, all of the nodes are updated so that their summary view represents the records of the database corresponding to that subset. Thus, each node displays the marginal distribution of its field values given the current state of the entire network.

In this embodiment, a user can click on a state contained within a node to narrow the current subset to only those records whose field values correspond to the state. For instance, in FIG. 8, the user has clicked on the node "Episode Type" and specifically on the state "mania." All values in this view represent only records where the field corresponding to "Episode Type" has a value that maps to the state "Mania." The percentage of 100% and the corresponding bar that extends across the scale indicate that all records in the subset have the value "mania." As a result, all values for all states in all nodes correspond to records in the database where "Episode Type" is "mania."

A user-defined input allows the user to specify a subset where the values do NOT map to "mania." By clicking on multiple nodes, a user can define complex subsets, in this embodiment.

Snapshot monitor—Various monitors allow the user to visually compare the marginal distributions under different subsets, and explore the contents and relationships of the data. A "snapshot" monitor can be displayed that visually highlights the differences between the current subset and a reference data set. Both the current subset and reference subset can be all records in the database or another, prior defined subset. The reference data set can be redefined at any time by the user. For instance the user can save the current subset as the reference subset. When the snapshot monitor is enabled, each state is drawn such that the probability/frequency distribution of each node under the reference data set is apparent. For example, in FIG. 8, the probability/frequency distributions under the reference subset are represented by thin black outlines to facilitate analysis.

Figure 8:
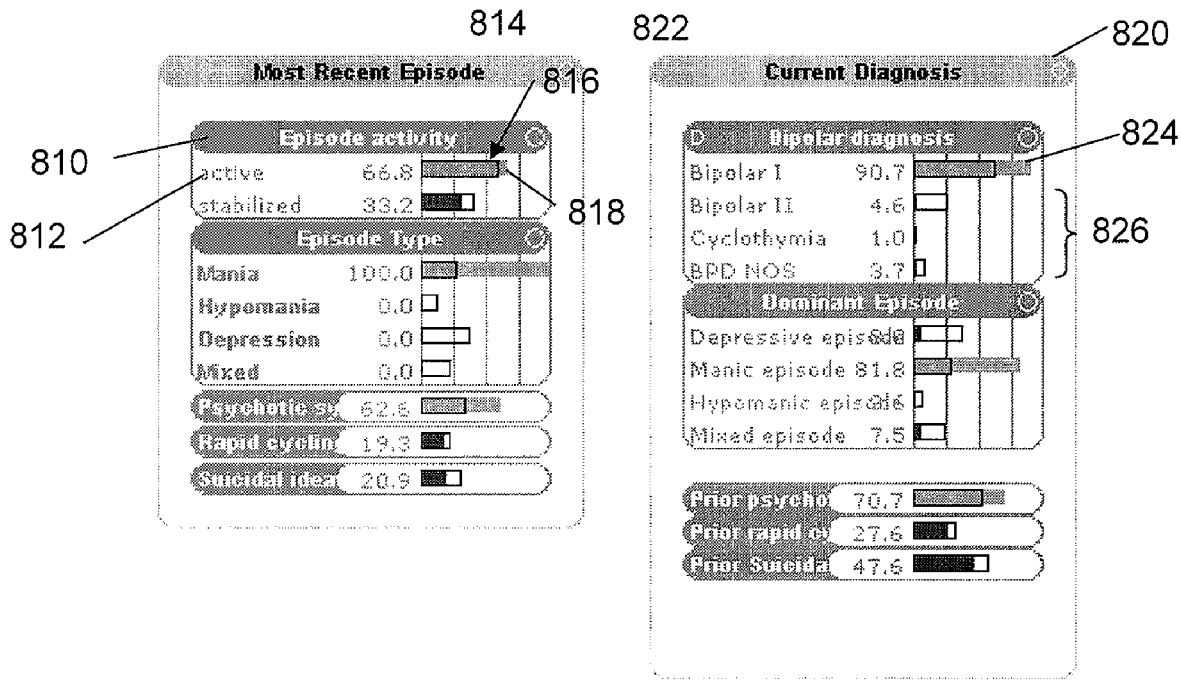
FIG. 8 shows an example of interactive nodes graphically represented, generated from the values in database of FIG. 1A.

This feature is illustrated in FIG. 8, where, for example, for the node "Episode Activity" 810 the state "active" 812 is shown as having a value of 66.8%. Its corresponding bar 814 has an outline 816 indicating the percentage of the reference data set of values and the color bar 818 graphically represents the 66.8% value of the current subset of values. Here, since the length of the color bar 818 is longer than that of the outline bar 816, the percentage is higher in the current subset than it is in the reference data set.

Figure 9:
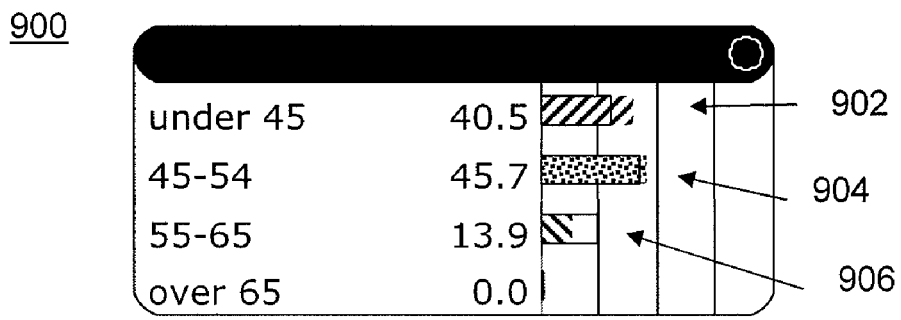
FIG. 9 shows an example of a graphical representation of a selection monitor, generated from the values in the database of FIG. 1A.

Additionally, the bars can be specified via the user to employ color, cross hatching, or any other visually distinctive means of representing increasing or decreasing values. For example, a red bar can indicate that the current value is significantly less than the reference value; a green bar can indicate that the current value is significantly greater than the reference value; a blue bar can indicate that there is no significant difference between the current and reference probabilities. FIG. 9 provides an example of a snapshot monitor for the node "Age." In FIG. 9, a right-to-left cross-hatching bar indicates green under such a color scheme, such as with bar 902. A stippled bar indicates blue under such a color scheme, such as with bar 804. And left-to-right cross hatching indicates red under such a color scheme, such as with bar 906.

Similarly, FIG. 8 provides an example of the snapshot monitor for groups of nodes. In the specific example of FIG. 8, the node Bipolar Diagnosis 820 shows that a state "Bipolar I" 822 has a bar 824 that extend beyond the outline of the reference data set values (and could be color coded in green), while the other states 826 have bars shorter than the outline bars of the reference data set (and could be color coded in red). The bar 824 for the state "Bipolar I" is 90.7%, while the bars 826 for the other states are each less than 5%. This indicates that patients who present manic are significantly more likely to be currently diagnosed as "Bipolar I" than "Bipolar II".

Statistical tests of significant differences can be based on one of various statistical tests, such as the "z-test" or "odds ratio" test. Exactly which statistical test is used is specifiable by the user.

Figure 10:
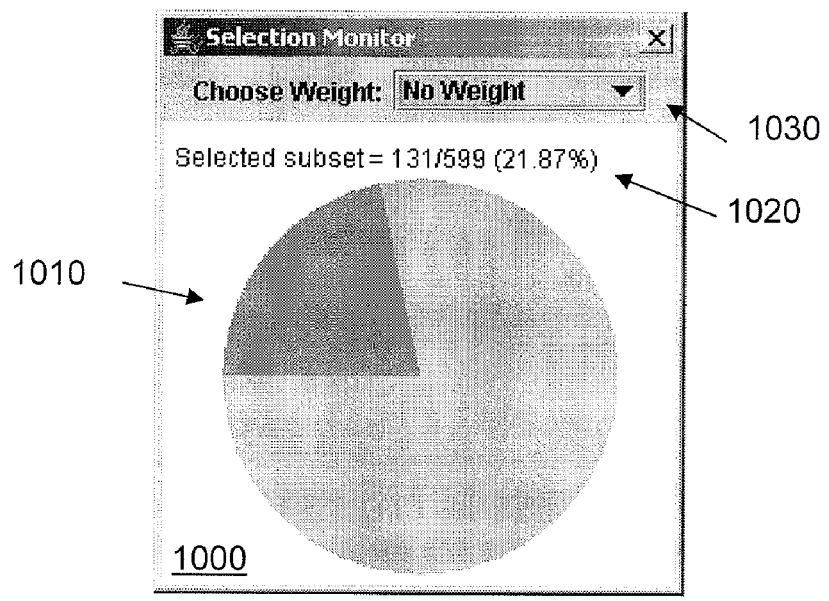
FIG. 10 shows an example of a graphical representation of a selection subset monitor, generated from the values in the database of FIG. 1A.

Selection subset monitor—A "selection subset" monitor shows the size of the currently selected subset. An illustrative embodiment of a selection subset monitor 1000 is illustrated in FIG. 10.

Here, the selection subset monitor 1000 is represented as a pie chart. The pie chart represents the number of records that satisfy the set of constraints that define the current data set, relative to the reference data set. The number of records in the current data set is represented by segment 1010 of the pie chart.

Selection subset monitor 1000 can also show a percentage 1020 corresponding to segment 1010 that represents the currently selected subset relative to the overall reference data set.

Additionally, the selection subset monitor 1000 can provide a mechanism for the user to select one or more weight variables to be applied. For example, the proportion of physician specialties containing in the database may not be reflective of the true proportion of physician specialties in the United States. A weight variable can be applied to the database in this fashion to more accurately reflect the real world scenario. If a weight variable is selected, then the sample sizes and pie chart are calculated using the weighting variable. In FIG. 10, the weight variable is selectable from a pull down menu 1030, and has a value of "No Weight."

Top Movers and Closest Neighbors—A "top movers" monitor and a "closest neighbors" monitor can each be included and configured to highlight interesting interrelationships among the data. They look similar, but have different criteria.

Figure 11A:
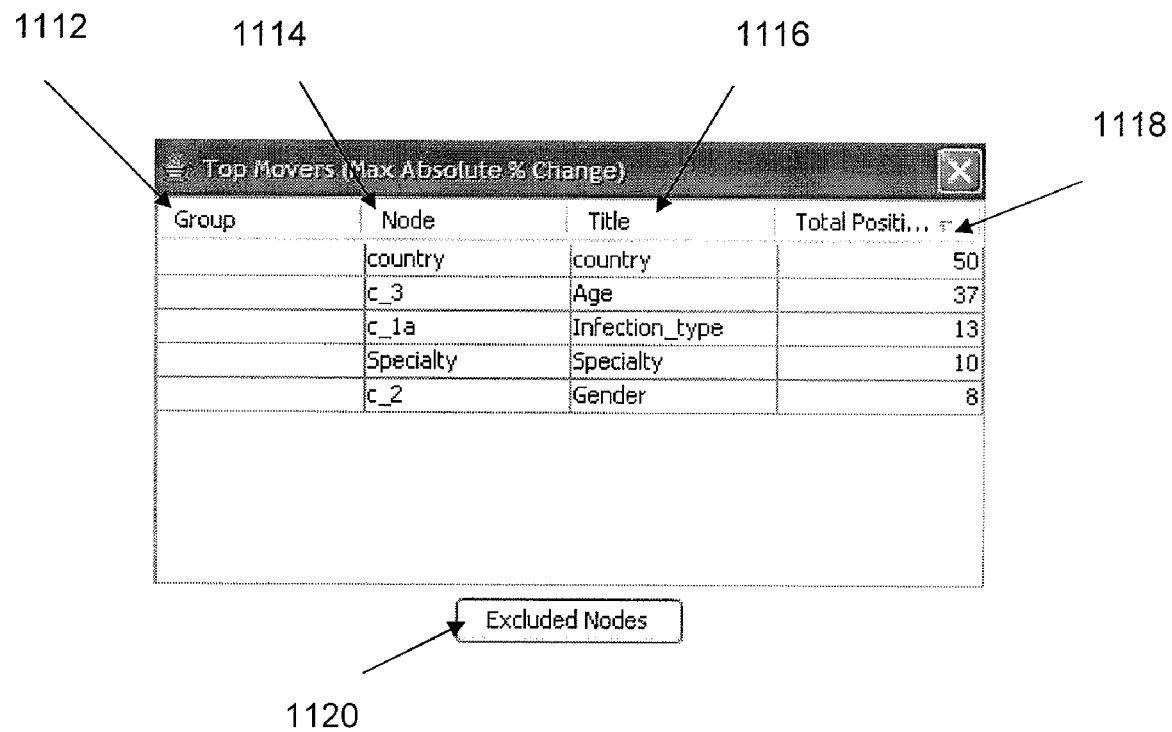
FIG. 11A shows an example of a graphical representation of a top movers monitor, in accordance with aspects of the invention.

FIG. 11A provides an illustrative embodiment of a top movers monitor 1100, which can identify the nodes whose marginal distributions are most (or least) different between the reference dataset and current subset. The first column 1112 lists to which group, if any, a node belongs. The second column 1114 lists the node label. The third column 1116 lists the title of the node, which may or may not be different from the node label. And the last column 1118 reflects the degree to which a node "moves" when selecting a subset of data—this measure can be set to be an absolute change, relative difference, or any other measure of change. Column 1118 can also be sortable, e.g., from great to least or vice versa. The "Exclude Nodes" button 1120 can be used to exclude nodes from the lists, at the user's option.

Figure 11B:
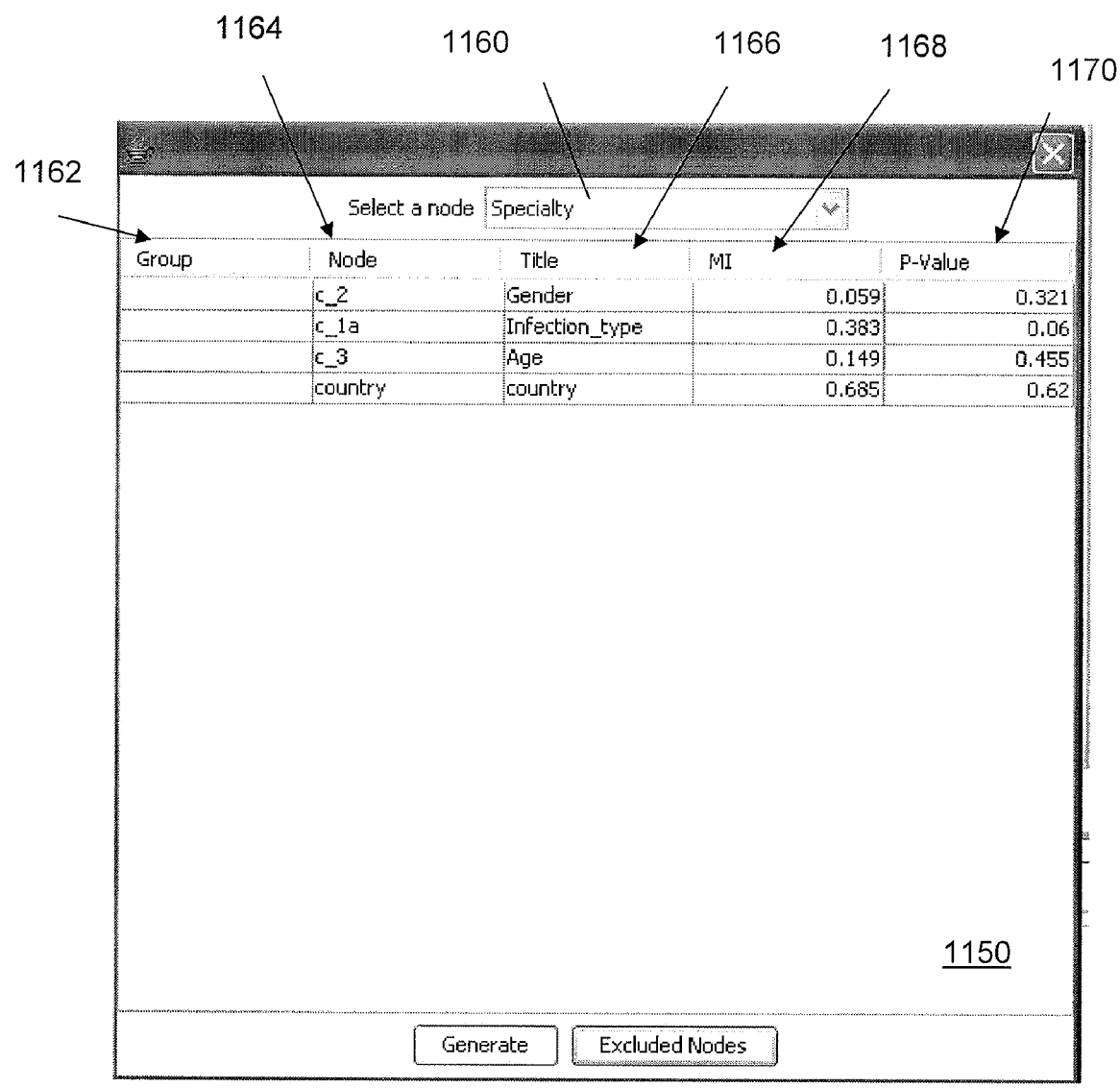
FIG. 11B shows an example of a graphical representation of a closest neighbors monitor, in accordance with aspects of the invention.

FIG. 11B provides an illustrative embodiment of a closest neighbors monitor 1150. The closest neighbors monitor 1150 indicates which nodes are most closely correlated with a selected node across all states contained in the specified nodes. This analysis is conducted on the reference data set only and does not relate to comparisons between the current data set and the reference set, in contrast with the Top Movers monitor 1100 in FIG. 11A. In FIG. 11B there is a column 1162 for the group to which the node belongs 1160 (if any), the node label 1164, the node title 1166, and two additional columns which reflect how "close" the additional nodes are to the selected node at the top of the screen (shown here as specialty). The column titled "MI" 1168 (for Mutual Information) is what actually measures how close a node is to the selected node, which is a standard statistical measurement. Other statistical measures could be used, such as chi squared. The last column reflects the P-value 1170 of the measured correlation of the "closest neighbor."

To generate the top movers monitor and the closest neighbors monitor, the user selects a node to monitor, either by clicking on it or selecting one from a list. The monitors then calculate correlations using one of various metrics of association between the selected node and every other node in the network.

Properties—Nodes can take on many different properties that communicate information about the node. For example, properties such as color can be used to indicate relationships. Nodes may be grouped into conceptual groups, as discussed above with node groupings. Some properties can be automatically recognized by the system (e.g. color, question text), but any number of new properties can be specified by the user.

In the illustrative example, color and shape can indicate whether nodes are, for example, patient versus physician factors, or considerations versus outcomes. Question text and description are additional properties that can be used to show the precise definition of a node. Question text is text that calls for a user text input; the text input is saved as an attribute for the corresponding question text property. Description is a property that also typically has a textual value, but does not typically call for a user input.

Figure 12:
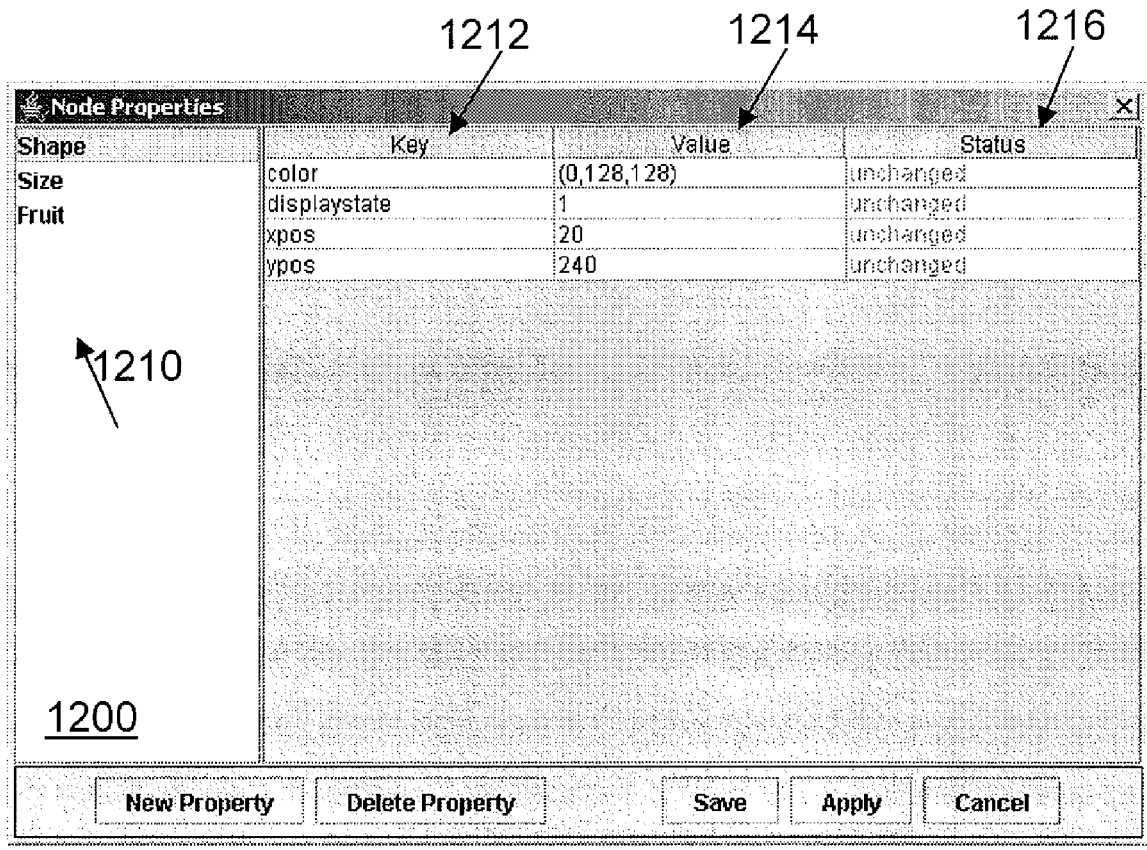
FIG. 12 shows an example of a graphical representation of a properties editor, generated from the values in the database of FIG. 1A.

An example of an embodiment of a properties editor 1200 is shown in FIG. 12, which can be displayed for a selected node. In FIG. 12, Shape, Size and Fruit 1210 are nodes contained in the map. Node properties or attributes are listed under the column "Key". Values of each property are located in the adjacent column titled "Value."

The node Shape is highlighted, which causes the associated properties under "Key" 1212 to be presented, along with the specific values of those properties under the column "Value" 1214 as well as the status of each node property under the column "Status" 1216. The attribute "color" specifies the color of the node. The attribute "displaystate" has either a "1" or "0" value, "1" if the state is to be displayed and "0" if the state is not to be displayed. The attributes "xpos" and "ypos" indicate the coordinates for displaying the node. The Status 1216 entries indicate those values for the respective attributes that have been changed or that remain unchanged.

The properties editor 1200 includes a "New Property" button used for defining a new property; a "Delete Property" button for deleting an existing property; a "Save" button for saving a new property or attribute change; an "Apply" button for applying any of the foregoing edits; and a "Cancel" button for cancelling any of the foregoing edits.

Figure 13:
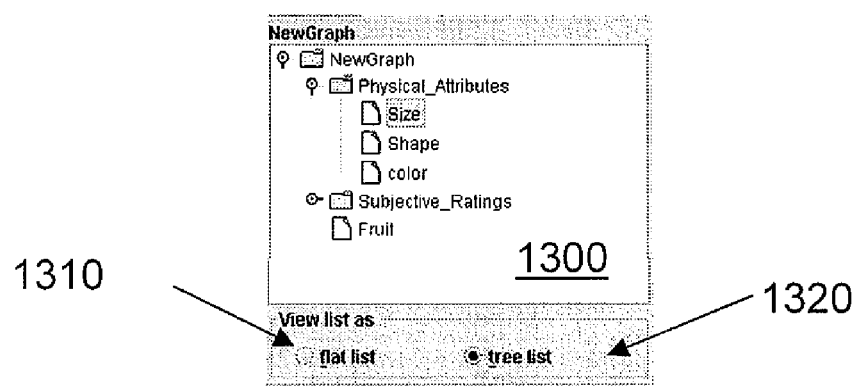
FIG. 13 shows an illustrative embodiment of a node selection panel, generated from the values in the database of FIG. 1A.

FIG. 13 shows an illustrative embodiment of a node selection panel 1300, which allows a user to quickly pan the nodes to locate, select, and display a particular node. The node selection panel 1300 can provide two views of a network. In one view, it displays an alphabetically sorted "flat list" of all nodes in the network, if the "flat list" button 1310 is selected. In the other view, the node selection panel provides a "tree list" of the network, with selection of button 1320. FIG. 1300 shows the tree list. The tree list interface can then be used to expand and minimize these groups. In either view, selecting a node causes the node to be selected in the network. Double-clicking a node can be used to cause the display to re-center on the selected node.

Figure 14A:
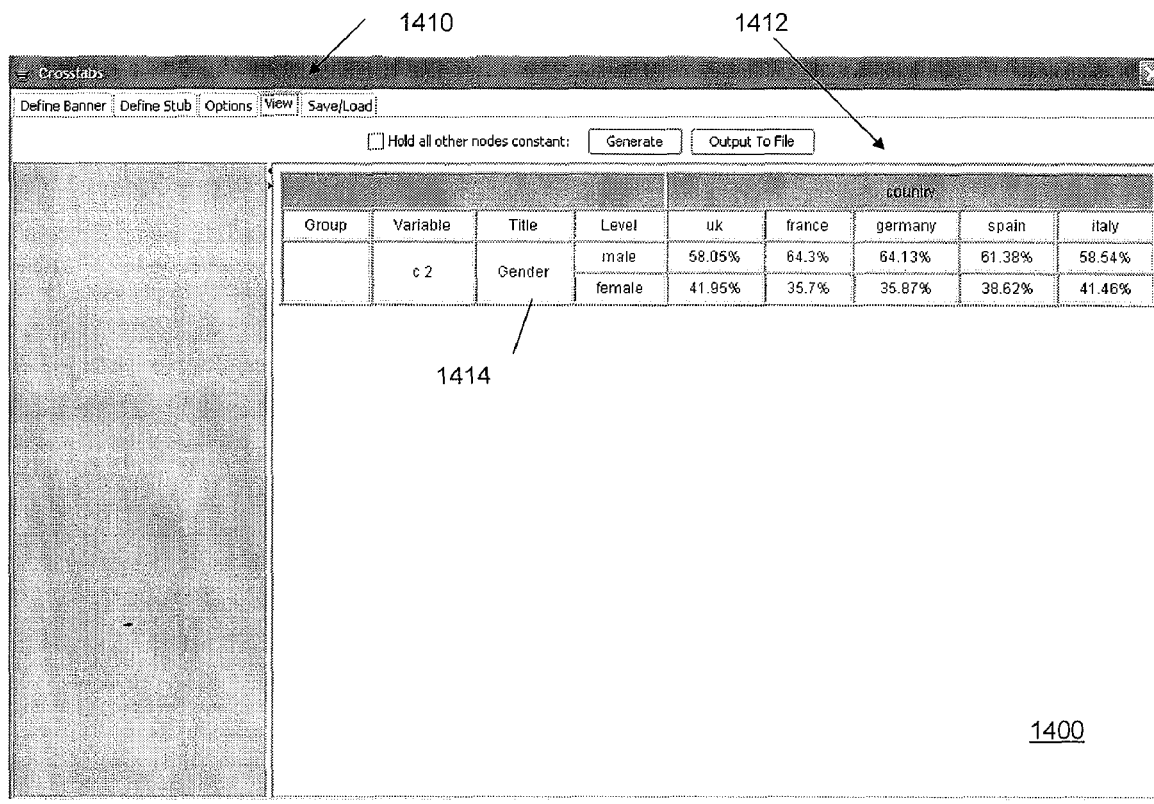
FIG. 14A shows an illustrative embodiment of a cross tabs feature, in accordance with aspects of the invention.

FIG. 14A shows an illustrative embodiment of a page 1400 showing the crosstabs (or cross tabulation) feature of the invention, which allows a user to quickly analyze data from two or mode nodes simultaneously via cross-tabulations. In this figure, the "View" tab 1410 is selected, which renders a crosstabs view having "Country" 1412 is the "banner" node and "Gender" 1414 is the "stub" node. A "banner" node is the node that appears at the top of a cross-tabulation. A "stub" node is the node that appears on the side of a cross-tabulation.

Figure 14B:
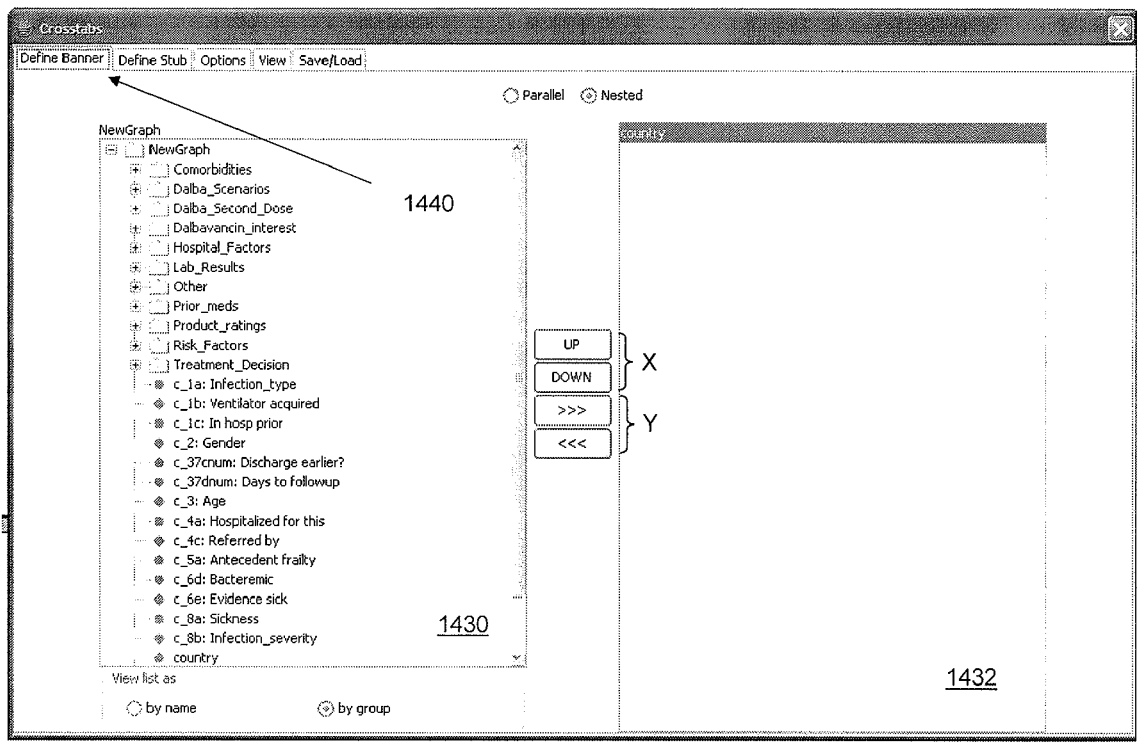
FIG. 14B shows an illustrative embodiment of a selection panel from which a user can select a node to be the "banner" of the cross-tabulation, in accordance with aspects of the invention.

FIG. 14B shows the selection panel 1430 from which a user can select a node to be the "banner" of the cross-tabulation. Selection panel is displayed in response to selection of "Define Banner" tab 1440. A similar process is conducted to select the "stub," however a figure of the stub selection panel is not included given its similarity to the banner panel. In this panel 1430, a folder structure is used to browse nodes for selection of a banner node. Here, "country" 1442 is the selected node, as indicated by its banner node panel 1432. The buttons indicated by "X" affect the order that the nodes appear in the crosstab. The buttons indicated by "Y" move selected nodes into and out off the banner node panel 1432. For example, selection of node and then button ">>>" causes the node to appear in banner node panel 1432. Similarly, selection of a node in banner node panel 1432 followed by selection of button "<<<" causes the selected node to be removed from the banner node panel 1432.

Figure 14C:
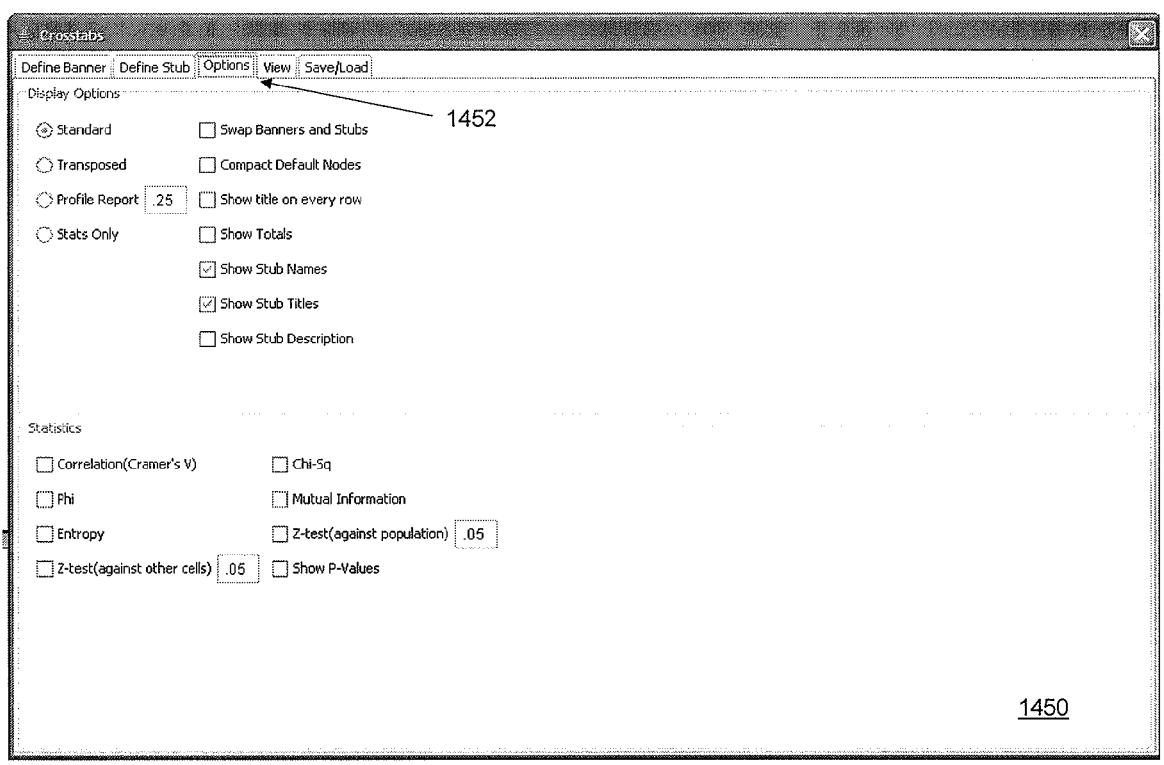
FIG. 14C shows an illustrative embodiment of "options" that can be selected and applied to the cross-tabulations, in accordance with aspects of the invention.

FIG. 14C shows an "options" page 1450, which can be selected via the "Options" tab 1452 and applied to the cross-tabulations. These options include, but are not limited to, the ability to apply standard statistical significance testing to the data, transposing the actual cross-tabulation, swapping the banners and stubs, and so on, as shown in the user selectable options of FIG. 14C.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. A database interaction system comprising:
    a database comprising a data set including a plurality of fields, wherein each field has an associated set of field values;
    at least one processor coupled to the database and configured to execute a series of computer modules comprising:
        a database interpreter configured to generate a graph model as a specification for representing data from the data set and relationships among the data within a domain, the graph model having a plurality of nodes that represent the plurality of fields, each node including a set of states representing a set of possible values for the node for the domain;
        a graph-to-data mapper configured, for each of the plurality of nodes, to map a field to a node, and field values associated with the field to states associated with the node;
        a graphical interface module configured to display:
            one or more nodes from the graph model, each displayed node including a distribution of field values across states of the displayed node: and
            arcs between two nodes that represent statistical relationships between the two nodes.

2. The system of claim 1, wherein the plurality of fields includes a set of predefined fields and at least one virtual field defined though user interaction with the graphical interface module.

3. The system of claim 1, wherein the graphical interface module is further configured to display one or more of a field name, node name, and descriptive label associated with the displayed one or more nodes or with one or more fields represented by the displayed one or more nodes.

4. The system of claim 1, wherein the display of one or more nodes includes a display of metadata.

5. The system of claim 4, wherein the graphical interface module is further configured to display the one or more nodes with graphical properties that indicate properties of the metadata.

6. The system of claim 5, wherein the graphical properties include one or more of color, shape, size, shading, and inclusion or omission of a character or icon.

7. The system of claim 4, wherein the metadata includes information associating at least two nodes from the one or more nodes as a group of nodes.

8. The system of claim 1, wherein the one or more nodes includes at least one group node, wherein a group node represents a joint distribution of field values associated with its constituent nodes.

9. The system of claim 1, wherein a domain can be discrete having a finite set of states or continuous having an infinite set of states.

10. The system of claim 1, wherein the distribution of field values across states includes field values represented as data in at least one of a histogram, a pie chart, a bar chart, a line graph, and a cross tab view.

11. The system of claim 1, wherein the distribution of field values across states includes a percentage of each of the field values associated with each of the states.

12. The system of claim 1, wherein the graphical interface module is further configured to display at least one statistical measure determined from the mapping of field values to states for at least one node.

13. The system of claim 12, wherein the at least one statistical measure comprises one or more of a mean, median, mode, and standard deviation.

14. The system of claim 1, wherein the graphical interface module is configured to graphically update each state in each of the displayed one or more nodes in response to selection of one state of one of the one or more nodes.

15. The system of claim 1, wherein the displayed one or more nodes is a representation of a reference data set and the graphical interface module is configured to enable selection of a current subset of data by selecting a state of one of the one or more nodes, and is further configured to display of the one or more nodes to include a comparison of the current subset of data to the reference data set for each state of each of the one or more nodes.

16. The system of claim 1, wherein the displayed one or more nodes is a representation of a reference data set and the graphical interface module is configured to enable selection of a current subset of data by selecting a state of one of the one or more nodes, and is further configured to display a snapshot of a node selected from the one or more nodes, wherein a snapshot is a comparative representation of the current subset of data with the reference data set for each state of the selected node.

17. The system of claim 16, wherein the comparative representation is graphically coded to indicate a greater than or less than difference of the current subset of data relative to the reference data set for each state of the selected node.

18. The system of claim 1, wherein the displayed one or more nodes is a representation of a reference data set and the graphical interface module is configured to enable selection of a current subset of data by selecting a state of one of the one or more nodes, and is further configured to display a selection subset monitor showing the size of the current subset of data relative to the data set contained in the database or a data subset contained in the one or more nodes for a given set of constraints, where size is a simple or weighted count of the relevant records that comprise the current subset of data.

19. The system of claim 1, wherein the displayed one or more nodes is a representation of a reference data set and the graphical interface module is configured to enable selection of a current subset of data by selecting a state of one of the one or more nodes, and is further configured to display a top movers monitor configured to show nodes from the plurality of nodes having a marginal distribution in the current subset of data that are either most different from or most similar to their distributions in the reference data set.

20. The system of claim 1, wherein the graphical interface module is further configured to display a closest neighbor monitor showing the nodes from the plurality of nodes that are most correlated with a selected node from the displayed one or more nodes.

21. A method of interacting with a database using a computer system having a display and a set of user input devices, the method comprising:
 providing a database having a data set including a plurality of fields, wherein each field has an associated set of field values; and
 the computer system:
  generating a graph model as a specification for representing data from the data set and relationships among the data within a domain, the graph model having a plurality of nodes that represent the plurality of fields, each node including a set of states representing a set of possible values for the node for the domain;
  for each of the plurality of nodes, mapping a field to a node and field values associated with the field to states associated with the node; and
  displaying one or more nodes from the graph model, each displayed node including a distribution of field values across states of the displayed node; and
  displaying arcs between two nodes that represent statistical relationships between the two nodes.

22. The method of claim 21, wherein the plurality of fields includes a set of predefined fields and at least one virtual field defined though user interaction with the data set.

23. The method of claim 21, further including displaying one or more of a field name, node name, and descriptive label associated with the displayed one or more nodes or with one or more fields represented by the displayed one or more nodes.

24. The method of claim 21, wherein the displaying one or more nodes includes displaying metadata.

25. The method of claim 24, further comprising displaying the one or more nodes with graphical properties that indicate properties of the metadata.

26. The method of claim 25, wherein the graphical properties include one or more of color, shape, size, shading, and inclusion or omission of a character or icon.

27. The method of claim 24, wherein the metadata includes information associating at least two nodes from the one or more nodes as a group of nodes.

28. The method of claim 21, wherein displaying one or more nodes includes displaying at least one group node, wherein a group node represents a joint distribution of field values associated with its constituent nodes.

29. The method of claim 21, wherein a domain can be discrete having a finite set of states or continuous having an infinite set of states.

30. The method of claim 21, wherein displaying the one or more nodes includes displaying the distribution of field values across states to include field values represented as data in at least one of a histogram, a pie chart, a bar chart, a line graph, and a cross tab view.

31. The method of claim 21, wherein displaying the one or more nodes includes displaying the distribution of field values across states to include a percentage of each of the field values associated with each of the states.

32. The method of claim 21, further including displaying at least one statistical measure determined from the mapping of field values to states for at least one node.

33. The method of claim 32, wherein the at least one statistical measure comprises one or more of a mean, median, mode, and standard deviation.

34. The method of claim 21, wherein displaying one or more nodes includes graphically updating each state in each of the displayed one or more nodes in response to selection of one state of one of the one or more nodes.

35. The method of claim 21, wherein the displayed one or more nodes is a representation of a reference data set and the method includes, in response to selection of a current subset of data by selecting a state of one of the one or more nodes, displaying the one or more nodes to include a comparison of the current subset of data to the reference data set for each state of each of the one or more nodes.

36. The method of claim 21, wherein the displayed one or more nodes is a representation of a reference data set and the method includes, in response to selection of a current subset of data by selecting a state of one of the one or more nodes, displaying a snapshot of a node selected from the one or more nodes, wherein a snapshot is a comparative representation of the current subset of data with the reference data set for each state of the selected node.

37. The method of claim 36, wherein the comparative representation is graphically coded to indicate a greater than or less than difference of the current subset of data relative to the reference data set for each state of the selected node.

38. The method of claim 21, wherein the displayed one or more nodes is a representation of a reference data set and the method includes, in response to selection of a current subset of data by selecting a state of one of the one or more nodes, displaying a selection subset monitor showing the size of the current subset of data relative to the data set contained in the database or a data subset contained in the one or more nodes for a given set of constraints, where size is a simple or weighted count of the relevant records that comprise the current subset of data.

39. The method of claim 21, wherein the displayed one or more nodes is a representation of a reference data set and the method includes, in response to selection of a current subset of data by selecting a state of one of the one or more nodes, displaying a top movers monitor configured to show nodes from the plurality of nodes having a marginal distribution in the current subset of data that are either most different from or most similar to their distributions in the reference data set.

40. The method of claim 21, further comprising displaying a closest neighbor monitor showing the nodes from the plurality of nodes that are most correlated with a selected node from the displayed one or more nodes.

41. A computer program product stored in a non-transitory computer readable media and configured for execution by a processor to carry out a method of interacting with a database using a set of user input devices, the method comprising:
providing a data set including a plurality of fields, wherein each field has an associated set of field values;
generating a graph model as a specification for representing data from the data set and relationship among the data within a domain, the graph model having a plurality of nodes that represent the plurality of fields, each node including a set of states representing a set of possible values for the node for the domain;
for each of the plurality of nodes, mapping a field to a node and field values associated with the field to states associated with the node; and
displaying one or more nodes from the graph model, each displayed node including a distribution of field values across states of the displayed node; and
displaying arcs between two nodes that represent statistical relationships between the two nodes.

42. The computer program product of claim 41, wherein the plurality of fields includes a set of predefined fields and at least one virtual field defined though user interaction with the data set.

43. The computer program product of claim 41, the method further including displaying one or more of a field name, node name, and descriptive label associated with the displayed one or more nodes or with one or more fields represented by the displayed one or more nodes.

44. The computer program product of claim 41, wherein the displaying one or more nodes includes displaying metadata.

45. The computer program product of claim 44, the method further comprising displaying the one or more nodes with graphical properties that indicate properties of the metadata.

46. The computer program product of claim 45, wherein the graphical properties include one or more of color, shape, size, shading, and inclusion or omission of a character or icon.

47. The computer program product of claim 44, wherein the metadata includes information associating at least two nodes from the one or more nodes as a group of nodes.

48. The computer program product of claim 41, wherein displaying one or more nodes includes displaying at least one group node, wherein a group node represents a joint distribution of field values associated with its constituent nodes.

49. The computer program product of claim 41, wherein a domain can be discrete having a finite set of states or continuous having an infinite set of states.

50. The computer program product of claim 41, wherein displaying the one or more nodes includes displaying the distribution of field values across states to include field values represented as data in at least one of a histogram, a pie chart, a bar chart, a line graph, and a cross tab view.

51. The computer program product of claim 41, wherein displaying the one or more nodes includes displaying the distribution of field values across states to include a percentage of each of the field values associated with each of the states.

52. The computer program product of claim 41, the method further including displaying at least one statistical measure determined from the mapping of field values to states for at least one node.

53. The computer program product of claim 52, wherein the at least one statistical measure comprises one or more of a mean, median, mode, and standard deviation.

54. The computer program product of claim 41, wherein displaying one or more nodes includes graphically updating each state in each of the displayed one or more nodes in response to selection of one state of one of the one or more nodes.

55. The computer program product of claim 41, wherein the displayed one or more nodes is a representation of a reference data set and the method includes, in response to selection of a current subset of data by selecting a state of one of the one or more nodes, displaying the one or more nodes to include a comparison of the current subset of data to the reference data set for each state of each of the one or more nodes.

56. The computer program product of claim 41, wherein the displayed one or more nodes is a representation of a reference data set and the method includes, in response to selection of a current subset of data by selecting a state of one of the one or more nodes, displaying a snapshot of a node selected from the one or more nodes, wherein a snapshot is a comparative representation of the current subset of data with the reference data set for each state of the selected node.

57. The computer program product of claim 56, wherein the comparative representation is graphically coded to indicate a greater than or less than difference of the current subset of data relative to the reference data set for each state of the selected node.

58. The computer program product of claim 41, wherein the displayed one or more nodes is a representation of a reference data set and the method includes, in response to selection of a current subset of data by selecting a state of one of the one or more nodes, displaying a selection subset monitor showing the size of the current subset of data relative to the data set contained in the database or a data subset contained in the one or more nodes for a given set of constraints, where size is a simple or weighted count of the relevant records that comprise the current subset of data.

59. The computer program product of claim 41, wherein the displayed one or more nodes is a representation of a reference data set and the method includes, in response to selection of a current subset of data by selecting a state of one of the one or more nodes, displaying a top movers monitor configured to show nodes from the plurality of nodes having a marginal distribution in the current subset of data that are either most different from or most similar to their distributions in the reference data set.

60. The computer program product of claim 41, the method further comprising displaying a closest neighbor monitor showing the nodes from the plurality of nodes that are most correlated with a selected node from the displayed one or more nodes.

* * * * *